United States Patent
Koshi et al.

(10) Patent No.: US 7,897,138 B2
(45) Date of Patent: Mar. 1, 2011

(54) PROCESS FOR PRODUCING ANTIMONY PENTAOXIDE

(75) Inventors: Teruyuki Koshi, Sodegaura (JP); Makoto Kawashima, Sodegaura (JP); Keitaro Suzuki, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 848 days.

(21) Appl. No.: 11/575,698

(22) PCT Filed: Sep. 15, 2005

(86) PCT No.: PCT/JP2005/017062
§ 371 (c)(1),
(2), (4) Date: Mar. 21, 2007

(87) PCT Pub. No.: WO2006/033283
PCT Pub. Date: Mar. 30, 2006

(65) Prior Publication Data
US 2008/0038187 A1    Feb. 14, 2008

(30) Foreign Application Priority Data
Sep. 21, 2004   (JP) .................. 2004-272791

(51) Int. Cl.
*C01G 3/00* (2006.01)
*B01F 3/12* (2006.01)
(52) U.S. Cl. ................ 423/617; 516/36; 516/91
(58) Field of Classification Search ............ 423/617; 516/91, 36
See application file for complete search history.

(56) References Cited

U.S. PATENT DOCUMENTS

| 4,110,247 A | | 8/1978 | Gower, II et al. |
| 4,533,538 A | * | 8/1985 | Kobashi et al. ............ 423/617 |
| 4,804,496 A | * | 2/1989 | Lowery et al. ............ 252/363.5 |
| 5,008,036 A | * | 4/1991 | Crompton et al. ............ 516/91 |
| 5,213,785 A | * | 5/1993 | Fentress et al. ............ 423/617 |

FOREIGN PATENT DOCUMENTS

| JP | 52 21298 | 2/1977 |
| JP | 52 123997 | 10/1977 |
| JP | 52 131998 | 11/1977 |
| JP | 53 20479 | 6/1978 |
| JP | 57 11848 | 3/1982 |
| JP | 59 232921 | 12/1984 |
| JP | 60 41536 | 3/1985 |
| JP | 60 137828 | 7/1985 |
| JP | 61 227918 | 10/1986 |
| JP | 62 182115 | 8/1987 |
| JP | 63 285120 | 11/1988 |
| JP | 2 180717 | 7/1990 |
| JP | 7 25549 | 3/1995 |
| JP | 11 49520 | 2/1999 |

* cited by examiner

Primary Examiner — Stanley Silverman
Assistant Examiner — James A Fiorito
(74) Attorney, Agent, or Firm — Oblon, Spivak, McClelland, Maier & Neustadt, L.L.P.

(57) ABSTRACT

The invention relates to a process for producing diantimony pentoxide having a high oxidation purity.
A process for producing an aqueous sol of diantimony pentoxide, which comprises mixing diantimony trioxide ($Sb_2O_3$) and an aqueous hydrogen peroxide solution in an aqueous medium, and after the temperature has reached from 50 to 80° C., reacting the diantimony trioxide with the aqueous hydrogen peroxide solution while keeping the reaction temperature at a level not higher by at least 10° C. than a desired set temperature in the temperature range, to thereby obtain a sol having dispersed in the aqueous medium diantimony pentoxide particles which have a primary particle size of from 2 to 50 nm and which have a diantimony trioxide/diantimony pentoxide weight ratio of not higher than 5 wt %.

19 Claims, No Drawings

PROCESS FOR PRODUCING ANTIMONY PENTAOXIDE

CROSS REFERENCE TO RELATED APPLICATION

This application is a 371 of PCT/JP05/017062, filed on Sep. 15, 2005, and claims priority to Japanese Patent Application No. 2004-272791, filed on Sep. 21, 2004.

TECHNICAL FIELD

The present invention relates to a process for producing diantimony pentoxide which provides a high oxidation efficiency (purity) represented by a $Sb_2O_3/Sb_2O_5$ weight ratio in the production of diantimony pentoxide ($Sb_2O_5$) by a reaction of diantimony trioxide ($Sb_2O_3$) with hydrogen peroxide.

BACKGROUND ART

A diantimony pentoxide sol is one which is used as a flame retarding adjuvant for plastics, fibers, etc., as a microfiller for a surface treating agent for plastics or glass, as an inorganic ion exchanger, as a catalyst component, as a pigment component, etc. Usually, a highly concentrated sol (containing from 30 to 50 wt % of $Sb_2O_5$) stabilized by an organic base, is used. Heretofore, as diantimony pentoxide sols, those obtained by the following methods have been known.

Namely, a method of deionizing an alkali metal antimonate by a cation exchange resin (Patent Documents 1 and 2), a method of reacting an alkali metal antimonate with an inorganic acid, followed by peptization (Patent Documents 3 and 4), etc. have been known.

As a method other than the above, a method of oxidizing diantimony trioxide with an aqueous hydrogen peroxide solution at a high temperature has been reported (Patent Documents 5, 6, 7 and 8). Further, a method of adding an inorganic alkaline substance at the time of the oxidation reaction of diantimony trioxide with an aqueous hydrogen peroxide solution, to control the particle size, has been reported (Patent Documents 9, 10 and 11).

Further, a method for preparing a sol showing excellent stability at the time of preparing an organo sol, is disclosed wherein an oxidation reaction of diantimony trioxide with an aqueous hydrogen peroxide is carried out in the presence of from 0.1 to 50 wt %, as $SiO_2$, of an inorganic silicic compound (Patent Document 12).

Further, as an example for application of high purity diantimony pentoxide, a fining agent for glass may be mentioned. Heretofore, it has been known that when glass raw material is melted, bubbles contained in molten glass will remain to deteriorate the transparency. For the purpose of preventing the deterioration of the transparency, a fining agent is used. As such a fining agent, diantimony trioxide and an oxidizing agent (such as sodium nitrate) are added to the molten glass, whereby the diantimony trioxide is changed to diantimony pentoxide, and thereafter, at a higher glass melting temperature, the diantimony pentoxide will be decomposed to diantimony trioxide. By oxygen generated at that time, the bubbles will be grown, whereby removal of bubbles contained in the glass will be accelerated. However, at the same time, nitrogen oxide will be formed, such being undesirable from the viewpoint of the environment, and further, such a method can not be applied to the production of alkali-free glass, since an alkali metal is incorporated in the glass. Under the circumstances, it is being studied to use diantimony pentoxide alone as a fining agent for glass (Patent Document 13).

Patent Document 1: U.S. Pat. No. 4,110,247
Patent Document 2: JP-B-57-11848
Patent Document 3: JP-A60-41536
Patent Document 4: JP-A-61-227918
Patent Document 5: JP-B-53-20479
Patent document 6: JP-A52-21298
Patent Document 7: JP-A-52-123997
Patent Document 8-JP-A-52-131998
Patent Document 9: JP-A-59-232921
Patent Document 10: JP-A-60-137828
Patent Document 11: JP-A-2-180717
Patent Document 12: JP-B-7-25549
Patent Document 13: JP-A-11-49520

DISCLOSURE OF THE INVENTION

Problems to be Solved by the Invention

Diantimony pentoxide particles in the diantimony pentoxide sol produced by the ion exchange method as disclosed in Patent Documents 1 and 2, have nearly spherical shapes and thus have characteristics such that the dispersibility is good and the stability is also good. However, in the production by such an ion exchange method, an alkali metal antimonate is used as the raw material, whereby an alkali metal (such as $Na_2O$ or $K_2O$) will remain in the product diantimony pentoxide sol, and its reduction is difficult, and there still remain problems such that it is difficult to produce a diantimony pentoxide sol having a diantimony pentoxide ($Sb_2O_5$) concentration of at least 10 wt %, and further that the operation to carry out separation and regeneration of the ion exchange resin, is cumbersome.

Whereas, by the oxidation method at a high temperature as disclosed in Patent Documents 5 to 8, it is possible to directly obtain a sol wherein diantimony pentoxide has a high concentration at a level of 30%, but it has drawbacks such that control of the reaction is difficult and bumping or the like is likely to occur during the production, such being dangerous or unsafe, and the reaction efficiency is also poor because of an abrupt reaction, and the residual amount of trivalent Sb tends to be high.

Further, as a method for controlling the reactivity in the production of a diantimony pentoxide sol by the oxidation method disclosed in Patent Documents 9 to 11, a method has been proposed wherein an inorganic alkaline substance is added during the reaction to carry out also the control of the particle size. However, such a reaction carried out in the presence of an inorganic alkaline substance has a drawback that the yellow color of the resulting diantimony pentoxide sol tends to be intensified, and the purity also decreases by the incorporation of the inorganic alkali metal.

Likewise, as a method for controlling the reactivity, a method for the production in the presence of an inorganic silicic compound, is also proposed as disclosed in Patent Document 12, but again, the purity decreases as silica is contained in the composition.

By the above-mentioned conventional oxidization method, even if the reaction is, for example, carried out in a $H_2O_2/Sb_2O_3$ molar ratio of 3.0 i.e. in an excess amount exceeding the stoichiometric mixture amount of 2.0, it is not easy to bring trivalent Sb to a level of a $Sb_2O_3/Sb_2O_5$ weight ratio of not exceeding 5%, and due to such remaining trivalent Sb, oxidation-reduction due to ultraviolet rays, etc., is likely to occur, and the resistance to light of diantimony pentoxide deteriorates (a color change such as yellowing is likely to occur). Further when it is used as a fining agent for glass, the amount of oxygen generated by its decomposition decreases, whereby the performance deteriorates.

In a case where diantimony pentoxide is used alone as a fining agent for glass, as the proportion of diantimony trioxide as an impurity is lower and the proportion of diantimony pentoxide is higher, its effect as a fining becomes high. Accordingly, diantimony pentoxide having a high oxidation efficiency (oxidation purity) is desired.

It is an object of the present invention to provide an industrial process for producing diantimony pentoxide having a high oxidation efficiency (purity).

Means to Solve the Problems

The present invention provides the following.
(1) A process for producing an aqueous sol of diantimony pentoxide, which comprises mixing diantimony trioxide ($Sb_2O_3$) and an aqueous hydrogen peroxide solution in an aqueous medium, and after the temperature has reached from 50 to 80° C., reacting the diantimony trioxide with the aqueous hydrogen peroxide solution while keeping the reaction temperature at a level not higher by at least 10° C. than a desired set temperature in the temperature range, to thereby obtain a sol having dispersed in the aqueous medium diantimony pentoxide particles which have a primary particle size of from 2 to 50 nm and which have a diantimony trioxide ($Sb_2O_3$)/diantimony pentoxide ($Sb_2O_5$) weight ratio of not higher than 5 wt %.
(2) The process for producing an aqueous sol of diantimony pentoxide according to the above (1), wherein the mixing of diantimony trioxide and an aqueous hydrogen peroxide solution in an aqueous medium is carried out by a method of mixing water with diantimony trioxide and an aqueous hydrogen peroxide solution.
(3) The process for producing an aqueous sol of diantimony pentoxide according to the above (1), wherein the mixing of diantimony trioxide and an aqueous hydrogen peroxide solution in an aqueous medium is carried out by a method of mixing diantimony trioxide with an aqueous hydrogen peroxide solution.
(4) The process for producing an aqueous sol of diantimony pentoxide according to any one of the above (1) to (3), wherein when the diantimony trioxide and the aqueous hydrogen peroxide solution are mixed, the resulting mixture is a slurry having a diantimony trioxide concentration of from 1 to 30 wt %.
(5) The process for producing an aqueous sol of diantimony pentoxide according to any one of the above (1) to (4), wherein after the temperature has reached from 50 to 80° C., the reaction temperature is immediately kept at a level not higher by at least 10° C. than a desired set temperature in the temperature range thereby to react the diantimony trioxide with the aqueous hydrogen peroxide solution, followed by cooling.
(6) The process for producing an aqueous sol of diantimony pentoxide according to any one of the above (1) to (5), wherein after the temperature has reached from 50 to 80° C., the reaction temperature is immediately kept at a level not higher by at least 10° C. and not lower by at least 5° C. than a desired set temperature in the temperature range thereby to react the diantimony trioxide with the aqueous hydrogen peroxide solution, followed by cooling.
(7) The process for producing an aqueous sol of diantimony pentoxide according to any one of the above (1) to (6), wherein the reaction temperature is at a level not higher by at least 5° C. than the desired set temperature.
(8) A process for producing an organic solvent sol of diantimony pentoxide, which comprises substituting an organic solvent for the aqueous medium of the aqueous sol of diantimony pentoxide produced by the process as defined in any one of the above (1) to (7).
(9) A process for producing a powder of diantimony pentoxide, which comprises drying the aqueous sol of diantimony pentoxide produced by the process as defined in any one of the above (1) to (7) under such a condition that the medium evaporates, followed by pulverization.

Effects of the Invention

The present invention is a process for producing a sol having diantimony pentoxide particles dispersed in an aqueous medium, which comprises reacting diantimony trioxide with hydrogen peroxide in an aqueous medium.

The diantimony trioxide is used in the form of agglomerated particles having an average particle size of at most 100 μm, preferably from 1 to 10 μm, having primary particles flocculated. The mixing of diantimony trioxide and hydrogen peroxide in an aqueous medium may be carried out by a first method of adding water with diantimony trioxide and an aqueous hydrogen peroxide solution, or a second method of mixing diantimony trioxide with an aqueous hydrogen peroxide solution. The mixture is supplied to the reaction in the from of a slurry, which, when diantimony trioxide is mixed, has a diantimony trioxide concentration of from 1 to 30 wt %.

The first embodiment of the present invention is a case where a slurry having diantimony trioxide dispersed in water is mixed with an aqueous hydrogen peroxide solution having a relatively high concentration. The second embodiment of the present invention is a method wherein a preliminarily diluted aqueous hydrogen peroxide solution is mixed with diantimony trioxide. Either method may be employed in the present invention.

In the first embodiment of the present invention, when the aqueous hydrogen peroxide is added to the slurry, diantimony trioxide particles will be dispersed in a state close to primary particles. With such primary particles of diantimony trioxide, the oxidation reaction of diantimony trioxide will proceed from their surface to the interior of the particles, whereby they change to diantimony pentoxide. Here, hydrogen peroxide may not be a special one, and it may be an industrial product commonly available, and a 35% hydrogen peroxide aqueous solution is usually employed.

In the second embodiment of the present invention, water is preliminarily added to a 35% hydrogen peroxide aqueous solution, and in such a diluted state, it is mixed with diantimony trioxide.

In the present invention, this oxidation reaction is carried out after the temperature has reached a reaction temperature of from 50 to 80° C., while the reaction temperature is kept at a level not higher by at least 10° C. than a desired set temperature in the reaction temperature range. Preferably, the reaction temperature is kept at a level not higher by at least 5° C. than the desired set temperature. During this oxidation reaction, if the temperature becomes higher by at least 10° C. than the set temperature, due to an abrupt oxidation reaction and growth of diantimony pentoxide particles and binding of the particles one another caused by such an oxidation reaction, the particle size distribution tends to be non-uniform, and not only that, as such an oxidation reaction advances from the surface towards the interior of diantimony trioxide particles, in the case of particles formed by abrupt growth of particles or binding of particles of diantimony pentoxide formed the oxidation reaction tends to hardly reach center portions of particles, whereby a non-reacted component will remain. This non-reacted component is an antimony oxide intermediate between diantimony trioxide and diantimony pentoxide, e.g. one taking such an oxidized state of $Sb_6O_{13}\{Sb_2O_3.2Sb_2O_5\}$.

Further, during such an oxidation reaction, if a temperature difference of at least 5° C. results in the temperature lowering direction, and if the lowered temperature is still in the reaction temperature range, the oxidation reaction will proceed mildly, and if time permits, the reaction will proceed by a long time reaction. However, in such a case, the oxidation reaction from the surface of particles is mild, and a non-reacted component will remain, and if such particles will be heated again from such a temperature to cause a temperature difference in the temperature rising direction, the growth of particles or binding of particles to one another will take place in a state where the non-reacted component will remain. As a result, also in such a case, particles having diantimony pentoxide only at the surface will be formed in a state where the non-reacted component remains inside.

In the present invention, the resulting particles will be entirely oxidized to diantimony pentoxide by the reaction, and the oxidation purity represented by the $Sb_2O_3/Sb_2O_5$ weight ratio will be not higher than 5 wt %, and thus, the present invention provides a process for producing a sol having diantimony pentoxide particles dispersed in an aqueous medium, whereby the oxidation purity of the product is very high.

Of such an aqueous sol, the dispersion stability can be improved by an addition of an organic base or a carboxylic acid. As a useful organic base, an alkanolamine such as triethanolamine or monoethanolamine an alkylamine such as n-propylamine or diisopropylamine, a quaternary ammonium hydroxide, or guanidine hydroxide, may, for example, be mentioned. Among them, an alkylamine is particularly preferred. As a useful carboxylic acid, a monocarboxylic acid such as formic acid or acetic acid, a dicarboxylic acid such as oxalic acid malonic acid, succinic acid, glutaric acid, adipic acid, or maleic acid, or an oxycarboxylic acid such as lactic acid, tartaric acid, citric acid, glycolic acid, malic acid, gluconic acid or mandelic acid, may, for example, be mentioned. Among the, an oxycarboxylic acid is particularly preferred.

The above-mentioned aqueous diantimony pentoxide sol can be concentrated by a usual method such as evaporation or ultrafiltration. Further, in order to increase the stability of the sol, it is preferred to adjust the pH to a level of from 5 to 8 by means of the above-mentioned organic base or carboxylic acid and then carry out the concentration.

Further, of the above-mentioned aqueous diantimony pentoxide sol, the dispersion medium can be changed from water to a hydrophilic organic solvent. As such a hydrophilic organic solvent, a lower alcohol such as methanol, ethanol or isopropanol, an alkylamide such as dimethylformamide or N,N-dimethylamide, a cyclic amide such as N-methyl-2-pyrrolidone, a glycol ether such as methyl cellosolve, ethyl cellosolve, butyl cellosolve or carbitol, or a polybasic alcohol such as ethylene glycol or glycerol, may, for example, be mentioned.

Such substitution of a hydrophilic organic solvent for water can be carried out by a usual method, such as a distillation substitution method under reduced pressure or normal pressure, or a substitution method by means of is an ultrafilter.

Further, the aqueous sol of diantimony pentoxide of the present invention may be dried under a condition where the medium will evaporate, whereby a powder of diantimony pentoxide having a primary particle size in a colloid region can be simply produced.

Such aqueous sol, organic solvent sol and powder of diantimony pentoxide have very high oxidation purity and thus are excellent in flame retardancy, ion exchange properties, etc. Utilizing such characteristics, they may be used as flame retardant adjuvants for plastics, fibers, etc., as microfillers for surface treating agents for plastics or glass, as inorganic ion exchangers, as catalyst components, as pigments components, etc.

Further, one in a powdered form is useful as a fining agent for glass, since the oxidation purity is particularly high.

BEST MODE FOR CARRYING OUT THE INVENTION

The powder of diantimony trioxide to be used in the present invention, is useful so long as it is one having an average particle size of roughly at most 100 µm. However, the average particle size is particularly preferably from 1 to 10 µm, from the viewpoint of the dispersibility or the reactivity with hydrogen peroxide. One having a purity of at least 99 wt %, as the content of diantimony trioxide, is preferred. As impurities, lead, arsenic, iron, etc., may be contained, and presence of such impurities is not troublesome from the viewpoint of the dispersibility or stability of the obtainable diantimony pentoxide particles.

In the present invention, the first method is mainly employed wherein a powder of diantimony trioxide is dispersed in an aqueous medium (typically pure water) and reacted in a slurry state with an aqueous hydrogen peroxide solution. This reaction solution may contain diantimony trioxide within a range of from 1 to 30 wt %, preferably from 5 to 20 wt %. To correspond to this concentration, the diantimony pentoxide sol as the product will be obtained within this concentration range. If this concentration is less than 1 wt %, such a concentration is too low, whereby the volume efficiency of the reactor decreases, such being uneconomical. On the other hand, if the concentration exceeds 30 wt %, due to an oxidation exothermic reaction, the temperature control can not adequately be carried out, whereby the reaction efficiency decreases, and further, secondary agglomeration among particles tends to increase, whereby the dispersibility of the resulting diantimony pentoxide particles tends to deteriorate such being undesirable.

Hydrogen peroxide to be used in the present invention is not required to be a special one and may be an industrial product which is commonly available, and a common 35% hydrogen peroxide aqueous solution can be used.

During the reaction of the present invention, the molar ratio of hydrogen peroxide to diantimony trioxide ($H_2O_2/Sb_2O_3$) is usually from 2.0 to 2.2, and it is preferably 2.0 which is the stoichiometric amount ratio. If this value is less than 2.0, the amount of hydrogen peroxide is inadequate to convert diantimony trioxide completely to diantimony pentoxide, and if it exceeds 2.2, $H_2O_2$ tends to be excessive, such being uneconomical, and further, there may be a trouble such as bubbling due to the remaining excess hydrogen peroxide or deterioration of a resin when the product is mixed with the resin, or in order to remove such excess hydrogen peroxide, a step of treatment such as decomposition by a catalyst or adsorption by means of activated carbon, may be required, such being undesirable.

In the present invention, diantimony trioxide and hydrogen peroxide are mixed in an aqueous medium, and after the temperature reaches from 50 to 80° C., the diantimony trioxide is reacted with the hydrogen peroxide by maintaining the reaction temperature at a level not higher by at least 10° C. than a desired set temperature in the temperature range.

Here, "after the temperature reaches from 50 to 80° C., the reaction temperature is kept at a level not higher by at least 10° C. than a desired set temperature in the temperature range" means that, for example, when the set temperature is 65° C., the reaction is carried out at a temperature of not higher than 75° C., or when the set temperature is 50° C. the reaction is carried out at a temperature of not higher than 60° C., or when the set temperature is 80° C., the reaction is carried out at a temperature of not higher than 90° C. Even when the reaction is carried out within a temperature range of from 50 to 80° C., if a temperature rise of at least 10° C. than the temperature preliminarily set and at which the reaction is initiated, occurs, the $Sb_2O_3/Sb_2O_5$ ratio in the diantimony pentoxide particles in the diantimony pentoxide sol as the product tends to be higher than 5 wt %, whereby diantimony pentoxide having a high oxidation purity tends to be hardly obtainable.

In the present invention, the temperature is raised from room temperature to a temperature range of from 50 to 80° C., and the temperature raising rate is from 0.5 to 5° C./min, and after the temperature reaches a desired set temperature, the temperature control is carried out to keep the reaction temperature at a level not higher by at least 10° C. than the set temperature. The temperature raising rate may be made higher taking into consideration the balance with a cooling installation, but an excess cooling installation will then be required, such being uneconomical.

In the process of the present invention, the above set temperature is such that the temperature is raised from room temperature and in a temperature range of from 50 to 80° C., a desired temperature is set by switching to cooling at a suitable timing, and this set temperature becomes the reaction initiation temperature. Further, after initiating the reaction at the above set temperature, the time point for terminating the reaction is when, after the reaction by adjusting the reaction temperature at the above-mentioned level based on the set temperature, the temperature is lowered towards a temperature range of from 50° C. to room temperature to carry out the temperature lowering not to raise the temperature again, and the temperature at the time of this temperature lowering is the temperature for terminating the reaction. In the present invention, the above-mentioned temperature control is carried out between the reaction initiation temperature and the reaction termination temperature.

The reaction of the present invention may proceed even if the temperature does not reach 50° C., but in such a case, the reaction time tends to be very long, such being economically undesirable. Further, the reaction is theoretically possible even when the temperature exceeds 80° C., but in reality, control of the reaction will thereby be very difficult, and a constant temperature reaction tends to be hardly carried out, whereby the oxidation efficiency (purity) tends to be low, and the $Sb_2O_3/Sb_2O_5$ ratio in the diantimony pentoxide particles in the diantimony pentoxide sol as the product tends to be higher than 5 wt %, such being undesirable.

By setting the reaction temperature in a range of from 50° C. to 80° C. and carrying out the reaction in a temperature rising range of up to 10° C., it is possible to obtain a sol which has a high oxidation efficiency (purity) with a $Sb_2O_3/Sb_2O_5$ ratio in the diantimony pentoxide particles in the diantimony pentoxide sol as the product being not higher than 5 wt % and which contains diantimony pentoxide particles having primary particle size of from 2 to 50 nm.

After the temperature reaches the above-mentioned from 50 to 80° C., preferably from 60 to 70° C., the reaction is preferably carried out by keeping the reaction temperature at a level not higher by at least 10° C., preferably at least 5° C., than a desired set temperature in the temperature range.

The oxidation reaction proceeds from the surface of diantimony trioxide particles, and when a change in the reaction temperature of at least 10° C. occurs in the state where the oxidation reaction is proceeding, a non-reacted component may remain at the center portions of the particles, or the growth of particles in such a state may take place. Accordingly, it is preferred to adopt a method wherein after the temperature reaches a reaction temperature of from 50 to 80° C., the reaction temperature is immediately kept at a level not higher by at least 10° C. than a desired set temperature within the reaction temperature range, to complete the reaction of diantimony trioxide with hydrogen peroxide.

Further, in a case where the temperature lowers from the set temperature, the oxidation reaction slowly proceeds if the reaction is carried out for a long time, but if there is an abrupt temperature rise again, the growth of particles is likely to proceed while the non-oxidized component remains in the interior of the particles, and as a result, such will be a cause for deteriorating the oxidation purity. Accordingly, it is preferred to employ a method wherein after the temperature reaches a reaction temperature of from 50 to 80° C., the reaction temperature is immediately kept at a level not higher by at least 10° C., preferably at least 5° C., than a desired set temperature within the reaction temperature range and not lower by at least 5° C. than the set temperature, to complete the reaction of the diantimony trioxide and the hydrogen peroxide, followed by heating, aging or cooling.

In the above method, when heating, aging or cooling is carried out after completion of the reaction, the heating is carried out beyond the reaction temperature range of from 50 to 80° C. or the cooling is carried out via the reaction temperature range of from 50 to 80° C. However, a temperature difference of at least 5° C. for the heating or cooling in the reaction temperature range of from 50 to 80° C. is not influential over the oxidation purity of the obtainable diantimony pentoxide.

It is considered that by carrying out the reaction of diantimony trioxide and an aqueous hydrogen peroxide solution at an extremely controlled reaction temperature, the reaction rate and the growth of particles are controlled, and oxidation proceeds efficiently.

By a usual method of reacting diantimony trioxide with an aqueous hydrogen peroxide solution at a high temperature, even if the reaction is carried out, for example, by adjusting the molar ratio of hydrogen peroxide to diantimony trioxide ($H_2O_2/Sb_2O_3$) to 3.0 i.e. an excess level, it is difficult to bring the $Sb_2O_3/Sb_2O_5$ ratio in the diantimony pentoxide particles in the diantimony pentoxide sol as the product to be not higher than 5 wt %.

The order of addition of the diantimony trioxide and the aqueous hydrogen peroxide solution is not particularly limited, but it is preferred to add them so that the molar ratio of hydrogen peroxide to diantimony trioxide readily becomes to be a ratio of from 2.0 to 2.2.

The reaction of diantimony trioxide with an aqueous hydrogen peroxide solution is a vigorous oxidation exothermic reaction, and in order to carry out this constant temperature reaction (the temperature-controlled reaction), the temperature control (adjustment) by cooling/heating of the reactor is essential. For such a temperature control, a method of supplying a cooling medium/heating medium to a usual jacket or coil of the reactor, or a method of circulating the reaction solution to an external heat exchanger may, for example, be used alone or in combination.

The diantimony pentoxide sol obtained by the present invention is a sol showing an acidity of pH 2 to 4. As a method of drying the obtained sol to a powder, a conventional method such as a method by a spray dryer or a drum dryer may, for example, be mentioned.

EXAMPLES

Example 1

Into a 1 L reaction flask equipped with a stirrer, 489.5 g of pure water was put, then 126.3 g of diantimony trioxide ($Sb_2O_3$ content: 99.9 wt %, manufactured by Guangdong Mikuni Antimony Industries, Co., Ltd.) was dispersed, and then 84.2 g of a 35% hydrogen peroxide aqueous solution (manufactured by Nippon Peroxide Co., Ltd.) was added, whereupon the mixture was heated and reacted. The $H_2O_2$/$Sb_2O_3$ molar ratio was 2.0. At the time of the reaction, the liquid temperature was raised from room temperature to 50° C., and the reaction was carried out for a reaction time of 8 hours, while the reaction temperature was maintained within a range of 50° C.±1° C. After completion of the reaction, stirring was maintained at 50° C. for further 1 hour to obtain 690.9 g of a yellowish white sol. The obtained sol had a pH of 2.50, an electroconductivity of 575 μs/cm and a primary particle size of from 15 to 30 nm. A part of this sol was dried at 150° C. to obtain a powder wherein the total $Sb_2O_5$ was 85.9 wt %, and $Sb_2O_3$ was 2.9 wt %, and the $Sb_2O_3$/$Sb_2O_5$ ratio in the diantimony pentoxide formed, was 3.4 wt %.

Example 2

Into a 1 L reaction flask equipped with a stirrer, 489.5 g of pure water was put, then 126.3 g of diantimony trioxide ($Sb_2O_3$ content: 99.5 wt %, manufactured by Guangdong Mikuni Antimony Industries, Co., Ltd.) was dispersed, and then 84.2 g of a 35% hydrogen peroxide aqueous solution (manufactured by Nippon Peroxide Co., Ltd.) was added, whereupon the mixture was heated and reacted. The $H_2O_2$/$Sb_2O_3$ molar ratio was 2.0. At the time of the reaction, the liquid temperature was raised from room temperature to 70° C., and the reaction was carried out for a reaction time of 3.5 hours, while the reaction temperature was maintained within a range of 70° C.±3° C., to obtain 698.2 g of a milky white sol. The obtained sol had a pH of 2.22, an electroconductivity of 2,910 μs/cm and a primary particle size of from 15 to 30 nm. A part of this sol was dried at 150° C. to obtain a powder wherein $Sb_2O_5$ was 86.4 wt %, and $Sb_2O_3$ was 3.8 wt %, and the $Sb_2O_3$/$Sb_2O_5$ ratio in the diantimony pentoxide formed, was 4.4 wt %.

Example 3

Into a 1 L reaction flask equipped with a stirrer, 489.5 g of pure water was put, then 126.3 g of diantimony trioxide ($Sb_2O_3$ content: 99.5 wt %, manufactured by Guangdong Mikuni Antimony Industries, Co., Ltd.) was dispersed, and then 84.2 g of a 35% hydrogen peroxide aqueous solution (manufactured by Nippon Peroxide Co., Ltd.) was added, whereupon the mixture was heated and reacted. The $H_2O_2$/$Sb_2O_3$ molar ratio was 2.0. At the time of the reaction, the liquid temperature was raised from room temperature to 80° C., and the reaction was carried out for a reaction time of 2.5 hours, while the reaction temperature was maintained within a range of 80° C.±5° C., to obtain 682 g of a milky white sol. The obtained sol had a pH of 2.2, an electroconductivity of 2,230 μs/cm and a primary particle size of from 15 to 30 nm. A part of this sol was dried at 150° C. to obtain a powder wherein $Sb_2O_5$ was 89.5 wt %, and $Sb_2O_3$ was 3.9 wt %, and the $Sb_2O_3$/$Sb_2O_5$ ratio in the diantimony pentoxide formed, was 4.4 wt %.

Example 4

Into a 2 m³GL (glasslining) reactor, 1,390 kg of pure water was put, then 400 kg of diantimony trioxide ($Sb_2O_3$ content: 99.5 wt %, manufactured by Chori Co., Ltd.) was dispersed, and then 293 kg of a 35% hydrogen peroxide aqueous solution (manufactured by Nippon Peroxide Co., Ltd.) was added, whereupon the mixture was heated and reacted. The $H_2O_2$/$Sb_2O_3$ molar ratio was 2.2. At the time of the reaction, the liquid temperature was raised from room temperature to 65° C., and the reaction temperature was maintained within a range of 65° C.±3° C., and thereafter the temperature was maintained at 70° C. for 1 hour for aging, to obtain 2,082 kg of a yellowish white sol. The obtained sol had a primary particle size of from 15 to 30 nm. The obtained sol was dried by using a spray dryer under such conditions that the inlet temperature was 350° C. and the outlet temperature was 130° C., to obtain 440 kg of a powder. In the obtained powder, $Sb_2O_5$ was 87.7 wt %, and $Sb_2O_3$ was 2.9 wt %, and the $Sb_2O_3$/$Sb_2O_5$ ratio in the diantimony pentoxide formed, was 3.3 wt %.

Example 5

Into a 12 m³GL (glasslining) reactor equipped with a stirrer, 6,000 kg of water was put, then 1,500 kg of diantimony trioxide ($Sb_2O_3$ content: 99.5 wt %, manufactured by Chori Co., Ltd.) was dispersed, and then 1,100 kg of a 35% hydrogen peroxide aqueous solution (manufactured by Nippon Peroxide Co., Ltd.) was added, whereupon the mixture was heated and reacted. The $H_2O_2$/$Sb_2O_3$ molar ratio was 2.2. At the time of the reaction, the liquid temperature was raised from room temperature to 55° C., and the reaction was carried out for a reaction time of 9 hours while the reaction temperature was maintained within a range of 55° C.±2° C., to obtain 8,550 kg of a yellowish white sol. The obtained sol had a primary particle size of from 15 to 30 nm. A part of the obtained sol was dried by using a spray dryer under such conditions that the inlet temperature was 350° C. and the outlet temperature was 130° C., to obtain about 1,000 kg of a powder. In the obtained powder, $Sb_2O_5$ was 88.5 wt %, and $Sb_2O_3$ was 3.7 wt %, and the $Sb_2O_3$/total $Sb_2O_5$ ratio in the diantimony pentoxide formed, was 4.2 wt %.

Comparative Example 1

Into a 12 m³GL (glasslining) reactor equipped with a stirrer, 2,040 kg of water was put, then 500 kg of diantimony trioxide ($Sb_2O_3$ content: 99.3 wt %, manufactured by Chori Co., Ltd. was added and dispersed, and then 330 kg of a 35% hydrogen peroxide aqueous solution (manufactured by Nippon Peroxide Co., Ltd.) was added, whereupon the mixture was heated and reacted. The $H_2O_2$/$Sb_2O_3$ molar ratio was 2.0. At the time of the reaction, the liquid temperature was raised from room temperature to 70° C., whereupon the heating was stopped. Thereafter, the liquid temperature rose to the boiling point (100° C.) by the heat of reaction. As the reaction was vigorous, and 400 kg of water was added during the reaction, and the reaction was carried out for a reaction time of about 1.5 hours. After completion of the reaction, stirring was maintained at a temperature of from 90 to 95° C. for 1.5 hours for aging to obtain 3,060 kg of a milky white sol. The obtained sol had a primary particle size of from 15 to 30 nm. The obtained sol was dried by a spray dryer under such conditions that the inlet temperature was 350° C. and the outlet temperature was 130° C., to obtain 550 kg of a powder. In this diantimony pentoxide powder, $Sb_2O_5$ was 90.0 wt % and $Sb_2O_3$ was 8.5 wt %, and the $Sb_2O_3/Sb_2O_5$ ratio in the diantimony pentoxide formed, was 9.4 wt %.

Comparative Example 2

Into a 1 L reaction flask equipped with a stirrer, 489.5 g of pure water was put, then 126.3 g of diantimony trioxide ($Sb_2O_3$ content: 99.5 wt %, manufactured by Guangdong Mikuni Antimony Industries, Co., Ltd.) was dispersed, and then, 84.2 g of a 35% hydrogen peroxide aqueous solution (manufactured by Nippon Peroxide Co., Ltd.) was added, whereupon the mixture was heated and reacted. The $H_2O_2/Sb_2O_3$ molar ratio was 2.0. At the time of the reaction, the liquid temperature was raised from room temperature to 70° C., and then the reaction was carried out from 70° C. to 100° C. The reaction time was about 1.5 hours, and after completion of the reaction, stirring was maintained at 95° C. for 1 hour for aging, to obtain 1,906 g of a yellowish white sol. The obtained sol had a primary particle size of from 15 to 30 nm. A part of the obtained sol was dried at 150° C. to obtain a powder wherein $Sb_2O_5$ was 90.0 wt % and $Sb_2O_3$ was 10.1 wt %, and the $Sb_2O_3/Sb_2O_5$ ratio in the diantimony pentoxide formed, was 11.2 wt %.

INDUSTRIAL APPLICABILITY

According to the present invention by a simple production process, an aqueous sol of diantimony pentoxide containing diantimony pentoxide particles having a high oxidation purity, can be obtained, and by a solvent substitution of the aqueous sol, an organic solvent sol can be obtained, and by drying the aqueous sol, a powder can be obtained. The aqueous sol, organic solvent sol and powder of diantimony pentoxide thus obtained, have a very high oxidation purity and thus are excellent in light resistance, water resistance, flame retardancy, ion exchange characteristics, discoloration resistance, etc. By utilizing such characteristics, they are useful as flame retardant adjuvants for plastics, fibers, etc., as microfillers for surface treating agents for plastics or glass, as inorganic ion exchangers, as catalyst components, as pigment components, etc.

Further, as the oxidation purity is particularly high, the powder is useful as a fining agent for glass.

The entire disclosure of Japanese Patent Application No. 2004-272791 filed on Sep. 21, 2004 including specification, claims, drawings and summary is incorporated herein by reference in its entirety.

The invention claimed is:

1. A process for producing an aqueous sol of diantimony pentoxide, which comprises
mixing diantimony trioxide, $Sb_2O_3$, and an aqueous hydrogen peroxide solution to form a mixture comprising said $Sb_2O_3$ and aqueous hydrogen peroxide solution,
heating said mixture to a set temperature of 50-80° C.,
reacting said mixture for a time of 2.5-9 hours and at a temperature which is no greater than 10° C. above said set temperature to obtain a sol having diantimony pentoxide particles dispersed in the aqueous medium, wherein
said diantimony pentoxide particles have a primary particle size of 2-50 nm and
upon said reacting, said sol has no greater than 5 wt % of diantimony trioxide, relative to the total amount of diantimony trioxide and diantimony pentoxide.

2. The process according to claim 1, wherein said mixing comprises mixing water with diantimony trioxide and an aqueous hydrogen peroxide solution.

3. The process according to claim 1, wherein said mixing comprises adding water to said aqueous hydrogen peroxide solution and mixing therein diantimony trioxide.

4. The process according to claim 1, wherein said mixture is in the form of a slurry having a diantimony trioxide concentration1-30 wt %.

5. The process according to claim 1, further comprising cooling said sol.

6. The process according to claim 1, further comprising cooling said sol, and
wherein said reacting is carried out at a temperature of 5° C. below said set temperature to not more than 10° C. greater than said set temperature.

7. The process according to claim 1, wherein
said temperature of said reacting does not exceed 5° C. above said set temperature.

8. A process for producing an organic solvent sol of diantimony pentoxide, which comprises substituting an organic solvent for the aqueous medium of the aqueous sol of diantimony pentoxide produced by the process as defined in claim 1.

9. A process for producing a powder of diantimony pentoxide, which comprises drying the aqueous sol of diantimony pentoxide produced by the process as defined in claim 1 under such a condition that the medium evaporates, followed by pulverization.

10. The process according to claim 1, wherein said heating occurs at a heating rate of 0.5-5° C./min until said set temperature is reached.

11. The process according to claim 1, wherein a molar ratio of hydrogen peroxide present in said aqueous hydrogen peroxide solution to said diantimony trioxide is from 2.0 to 2.2.

12. The process according to claim 1, further comprising adding an organic base or a carboxylic acid to said sol to adjust a pH of said sol to a pH of 5-8.

13. The process according to claim 1, wherein said mixture is in the form of a slurry having a diantimony trioxide concentration of 5-20 wt %.

14. The process according to claim 1, wherein each of said mixing, heating, and reacting occurs in a same reaction vessel.

15. The process according to claim 1, wherein said mixture consists of said $Sb_2O_3$ and aqueous hydrogen peroxide solution.

16. A process for producing an aqueous sol of diantimony pentoxide, which comprises
mixing diantimony trioxide, $Sb_2O_3$, and hydrogen peroxide present in a hydrophilic organic solvent medium to form a mixture comprising said $Sb_2O_3$ and hydrogen peroxide,
heating said mixture to a set temperature of 50-80° C., and
reacting said mixture for a time of 2.5-9 hours and at a temperature which is no greater than 10° C. above said set temperature to obtain a sol having diantimony pentoxide particles dispersed in the hydrophilic organic solvent medium, wherein
said diantimony pentoxide particles have a primary particle size of 2-50 nm and upon said reacting, said sol has no greater than 5 wt % of diantimony trioxide, relative to the total amount of diantimony trioxide and diantimony pentoxide.

17. The process according to claim 16, wherein said heating occurs at a heating rate 0.5-5° C./min until said set temperature is reached.

18. The process according to claim 16, wherein said a hydrophilic organic solvent medium comprises at least one of methanol; ethanol; isopropanol; dimethylformamide; N,N-dimethylamide; N-methyl-2-pyrrolidone; methyl cellosolve; ethyl cellosolve; butyl cellosolve; carbitol; ethylene glycol; or glycerol.

19. The process according to claim 16, wherein said mixture consists of said $Sb_2O_3$ and hydrogen peroxide.

* * * * *